(12) United States Patent
Snider et al.

(10) Patent No.: US 7,977,833 B2
(45) Date of Patent: Jul. 12, 2011

(54) DIODE LEAD SUPPORT SHELL

(75) Inventors: Tommy Snider, Oro Valley, AZ (US);
David Minke, Tucson, AZ (US);
Benjamin Baltierra, Mexicali (MX);
Arturo Maceda, Mexicali (MX)

(73) Assignee: Honeywell International Inc.,
Morristown, NJ (US)

( * ) Notice: Subject to any disclaimer, the term of this patent is extended or adjusted under 35 U.S.C. 154(b) by 411 days.

(21) Appl. No.: 12/271,769

(22) Filed: Nov. 14, 2008

(65) Prior Publication Data

US 2010/0123373 A1    May 20, 2010

(51) Int. Cl.
*H02K 11/00* (2006.01)
*H02K 11/04* (2006.01)
*H02K 19/36* (2006.01)

(52) U.S. Cl. ............. 310/68 D; 310/71; 310/89; 310/43

(58) Field of Classification Search ............... 310/68 D, 310/91, 43, 71, 135, 233; H02K 11/00, 11/04, H02K 19/36
See application file for complete search history.

(56) References Cited

U.S. PATENT DOCUMENTS

| | | | |
|---|---|---|---|
| 4,959,572 A | 9/1990 | Becker | |
| 5,386,167 A * | 1/1995 | Strobi | 310/237 |
| 5,705,867 A | 1/1998 | Jeon | |
| 6,657,355 B2 * | 12/2003 | Kiyose et al. | 310/237 |
| 6,674,212 B2 * | 1/2004 | Inukai et al. | 310/223 |
| 6,838,802 B2 * | 1/2005 | Tekawade | 310/239 |
| 2002/0180300 A1 * | 12/2002 | Inukai et al. | 310/233 |
| 2005/0206352 A1 * | 9/2005 | Xu et al. | 322/52 |
| 2005/0285603 A1 * | 12/2005 | Davis et al. | 324/545 |
| 2006/0038405 A1 * | 2/2006 | Xu et al. | 290/31 |
| 2006/0158053 A1 * | 7/2006 | Aschoff et al. | 310/91 |
| 2006/0214427 A1 * | 9/2006 | Xu et al. | 290/40 C |
| 2006/0284499 A1 * | 12/2006 | Rubbo et al. | 310/68 D |
| 2007/0108854 A1 * | 5/2007 | Osborn et al. | 310/68 D |
| 2010/0123373 A1 * | 5/2010 | Snider et al. | 310/68 D |

* cited by examiner

*Primary Examiner* — Burton Mullins
*Assistant Examiner* — John K Kim
(74) *Attorney, Agent, or Firm* — Miriam Jackson, Esq.

(57) ABSTRACT

A shell that mechanically supports the diode lead wires against movement both during assembly and subsequent operation of the rotor shaft. In addition, the present invention relates to a method for retaining diode lead wires in a power generator rotor by using the shell of the present invention.

19 Claims, 6 Drawing Sheets

DIODE LEAD SUPPORT SHELL

BACKGROUND OF THE INVENTION

The present invention generally relates to rotating electrical machines, and more particularly to a device and method for retaining diode lead wires to prevent mechanical failure when the lead wires are subject to centrifugal forces.

Rotating electrical machines, such as motors and generators, are well known in the art. In recent years, numerous designs of these electrical machines have been proposed to reduce the size and cost of these machines. One of the most popular prior art designs include adding to the device a rectifier assembly.

While many of the prior art approaches to reduce the size and cost of the machine have been found satisfactory for their intended applications, the new designs added further disadvantages to the machine.

Basically, in a rectifier assembly, diodes are mounted to a heat sink that is attached to the rotor. Generally, there is either three diodes or six diodes mounted on the heat sink to provide the half wave or full wave rectification. The diode lead wires are fed through openings in the exciter core and attached to the diodes. The diodes can be mounted in several different arrangements, for example: an axial arrangement where the centerline of the diodes is parallel to and radially outward from the centerline of the rotor shaft; a perpendicular arrangement where the centerline of the diodes is at right angles to and radially outward of the centerline of the rotor shaft; and an angular arrangement where the centerline of the diodes is somewhere between parallel to and perpendicular to the centerline of the rotor shaft. The axial arrangement generally results in a smaller, lighter package and, therefore, is a desirable and frequently required mounting arrangement On axial mounted diodes, the leads are attached using a bolt, nut, washer, and flat washer. The length of the leads between the core opening and the diode connection varies, but they are always acted on by centrifugal forces created by the rotor rotation. Unfortunately, this type of assembly is subject to mechanical failure from the bending moment applied to the lead of the diode resulting from the centrifugal force generated by the rotor rotation.

The length of these leads is not mechanically supported and is subject to stress from centrifugal forces when the machine is in operation as well as forces from angular acceleration and deceleration and vibration of the electrical machine, including rotational vibration. Thus, it is imperative to restrain the leads to prevent the centrifugal forces from deforming or breaking the diode connection.

The prior art restrains the length of the leads by tying them to the rotor shaft with a lacing cord made of NOMEX® impregnated with epoxy. Unfortunately, this method often fails to hold the leads in place due to the expansion of the lacing cord in view of the same centrifugal forces acting on the leads.

As can be seen, there is a need for a structure which will mechanically support the diode lead wires during the operation of the electrical machine. Such a structure should be simple in design and relatively low cost in manufacture.

SUMMARY OF THE INVENTION

In one aspect of the present invention, a shell for holding lead wires comprises an annular body having a centrally located opening and a V-shaped cross section; the V-shaped cross section comprises an outer wall and an inner wall; the outer wall, the inner wall, and the interior surface of the V-shaped cross section forms an annular channel; the outer wall has a conical shape and comprises a plurality of projecting flaps and recess areas; the projecting flaps extend upwardly from the annular channel and bend away from the center of the shell; the inner wall extends upwardly from the annular channel and is free of projections and/or recess; and the annular channel hold the lead wires in position.

In another aspect of the present invention, an electrical power generator system comprises a housing; an end bell; a rotor; an exciter coaxially mounted on the rotor shaft. The exciter includes a plurality of diodes located on the circumference of the rotor shaft. Each diode includes lead wires routed around the rotor shaft. The system also includes a shell for holding lead wires; the shell is mounted on to the rotor shaft and comprises: an annular body having a centrally located opening and a V-shaped cross section; the V-shaped cross section comprises an outer wall and an inner wall; the outer wall, the inner wall, and the interior surface of the V-shaped cross section forms an annular channel; an electrical power generator system comprises a housing; an end bell; a rotor; an exciter coaxially mounted with the rotor shaft. The exciter includes a plurality of diodes located on the circumference of the rotor shaft. Each diode includes lead wires routed around the rotor shaft. The system also includes a shell for holding lead wires; the shell is mounted on to the rotor shaft and comprises: an annular body having a centrally located opening and a V-shaped cross section; the V-shaped cross section comprises an outer wall and an inner wall; the outer wall, the inner wall, and the interior surface of the V-shaped cross section forms an annular channel; the outer wall has a circular shape and comprises a plurality of projecting flaps and recess areas; the projecting flaps extend upwardly from the annular channel and bend away from the center of the shell; the inner wall extends upwardly from the annular channel and is free of projections and/or recess; the annular channel holds the leads wires in position; the shell rotates when the rotor shaft rotates.

Another aspect of the present invention contemplates a method for retaining diode lead wires in a power generator. The method comprising a step of providing a rotor shaft having a plurality of diodes placed around said rotor shaft. Each diode including lead wires routed around the rotor shaft. A further step may include inserting a shell over the rotor shaft. The shell comprising: an annular body having a centrally located opening and a V-shaped cross section. The V-shaped cross section comprises an outer wall and an inner wall. The outer wall, the inner wall, and the interior surface of the V-shaped cross section forms an annular channel. The outer wall has a circular shape and comprises a plurality of projecting flaps and recess areas. The projecting flaps extend upwardly from the annular channel and bend away from the center of the shell. The inner wall extends upwardly from the annular channel and is free of projections and/or recess.

A further step may include routing the diode lead wires into the annular channel of the shell.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Embodiments of the present invention generally provide a shell that mechanically supports the diode lead wires against movement both during assembly and subsequent operation of the rotor shaft.

As described before, during rotation of the rotor shaft, high centrifugal forces are generated and there is a tendency for the lead wires to move radially outwardly thereby tending to twist the lead wires. Such movement stresses the portions of the lead wires which are connected to the diode and an object of the present invention is to provide a lead wires shell which will be resistant to twisting movement created by the centrifugal force.

Figure 1:
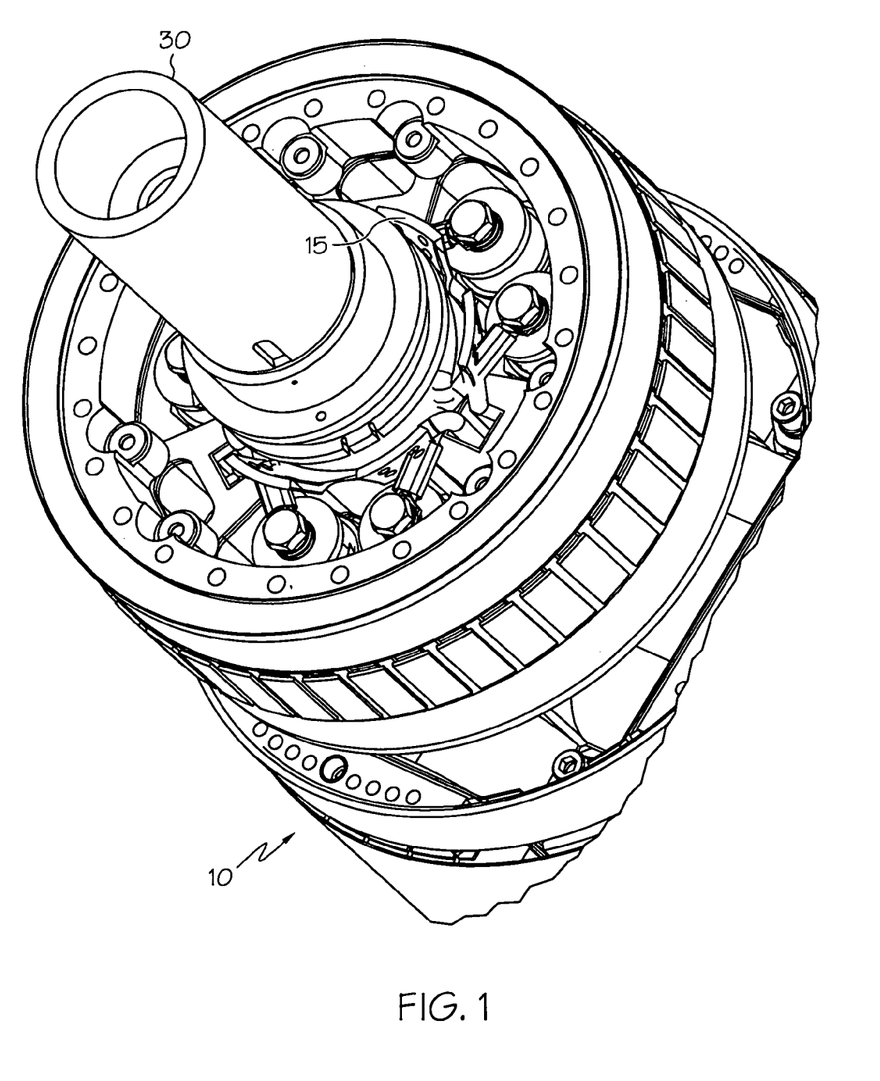
FIG. 1 illustrates a perspective view of a power generator rotor 10 including the diode lead support shell 15 of one aspect of the present invention.

FIG. 1 illustrates a perspective view of a power generator rotor 10 including the diode lead support shell 15 of the present invention.

Figure 2:
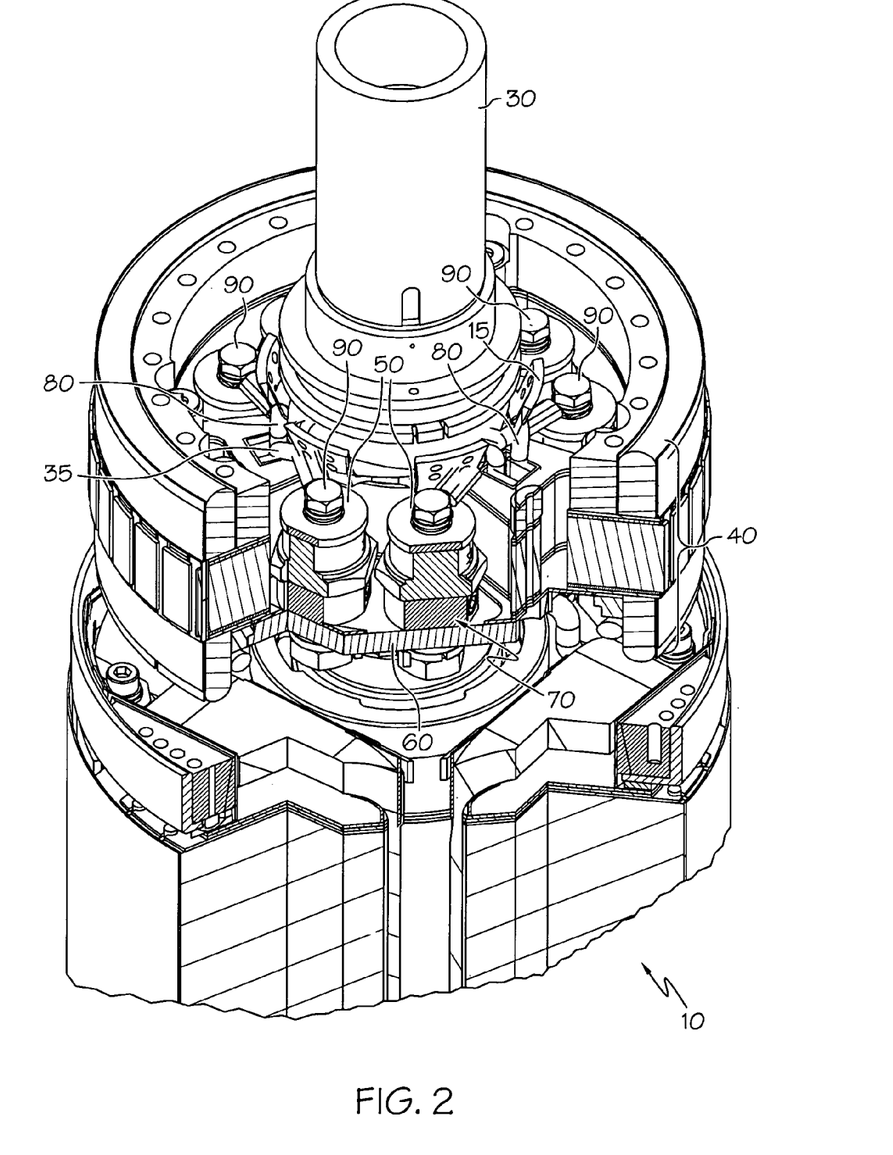
FIG. 2 illustrates a front cross section view of the power generator rotor exciter of FIG. 1.

FIG. 2 illustrates a perspective cross section view of the power generator rotor of FIG. 1. The power generator rotor 10 includes a rotor shaft 30, and an exciter assembly 40 for excitation of said power generator 10. The exciter assembly 40 is coaxially mounted on to the rotor shaft 30, wherein in between there is an air gap 35. The exciter assembly 40 includes a plurality of diodes 50 located at equidistant points about the circumference of rotor shaft 30. The pluralities of diodes 50 are mounted in a standoff 70, which is then mounted to the exciter heat sink 60. Each diode lead 80 is routed through the diode lead support shell 15 and connected to the diode 50 with a screw 90.

Figure 3:
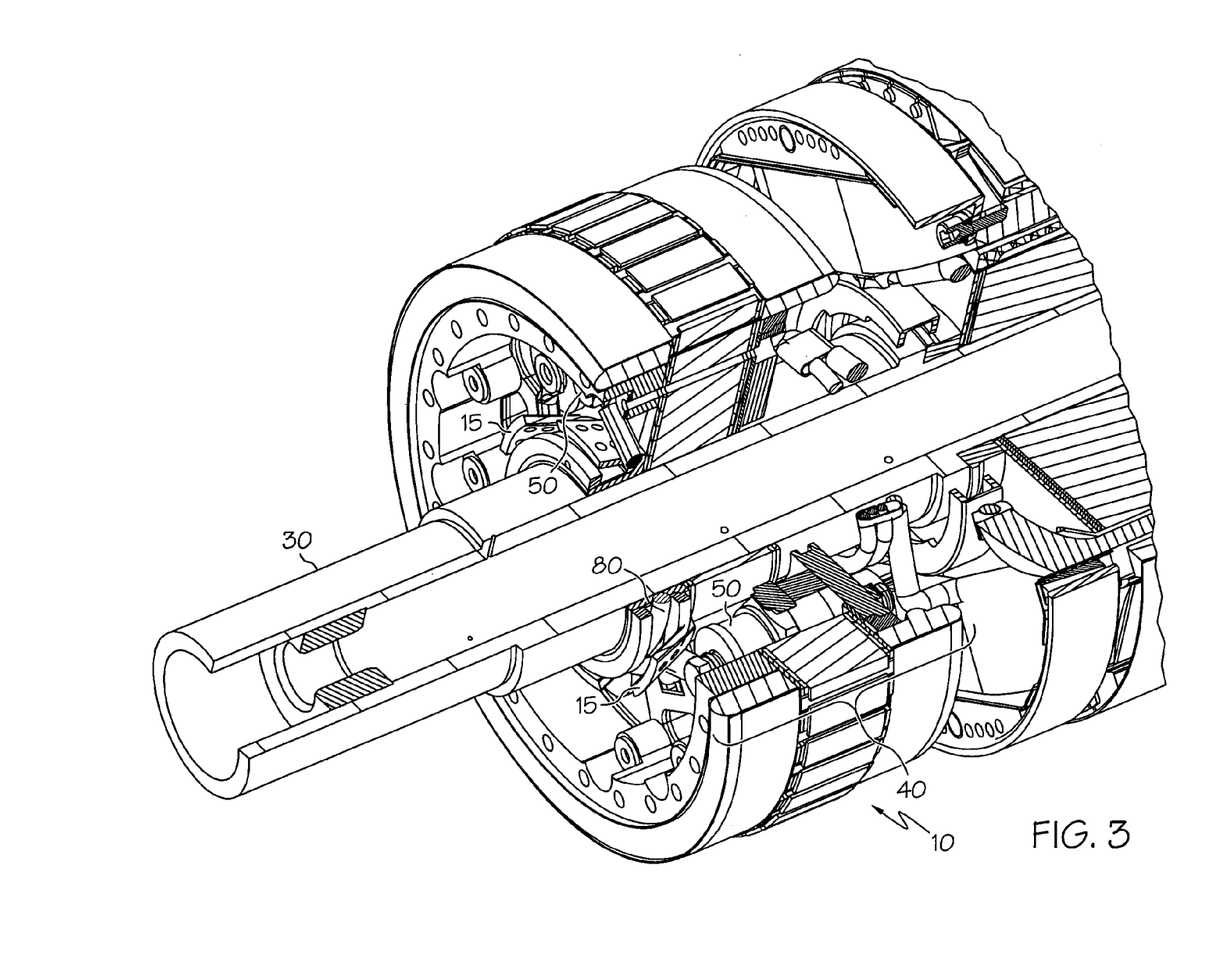
FIG. 3 illustrates a side cross section view of the power generator rotor exciter of FIG. 1.

FIG. 3 illustrates a perspective cross section view of the power generator rotor 10 of FIG. 1.

Figure 4:
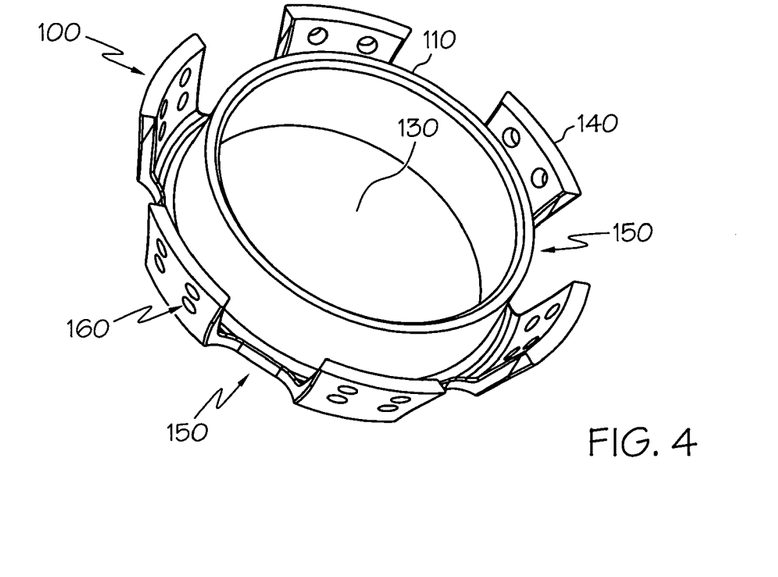
FIG. 4 illustrates a perspective view of the diode lead support shell according to another aspect of the present invention.

FIG. 4 illustrates a perspective view of the diode lead support shell 15 (hereafter called "shell") for holding the lead wires 80 according to the present invention. Referring to FIGS. 4-7, the shell 15 comprises an annular body having a centrally located opening 130 and a "V"-shaped cross section 115. The "V"-shaped cross section 115 of the shell 15 comprises an outer wall 100 and an inner wall 110. The outer wall 100, the inner wall 110, and the interior surface of the shell's "V"-shaped cross section 115 forms an annular channel 120. The inner wall 110, outer wall 100, and the annular channel 120 are machined as an integral piece. As used herein the term V-shaped cross section means substantially V-shaped but does not require a specifically angular bottom portion or any particular degrees of angle of such bottom portion and may include U-shaped, C-shaped and intermediate cross sections.

The centrally located opening 130 is substantially of the same diameter as the outer diameter of the rotor shaft 30. As such, the opening 130 serves to maintain concentricity between the shell 15 and the rotor shaft 30. The shell 15 is fixedly mounted to the rotor shaft 30 such that when the rotor shaft 30 rotates, the shell 15 also rotates.

The thickness of the shell 15 is controlled to some extent by the material selected for forming the shell 15, as well as the desired degree of mechanical support for the lead wires 80.

The shell 15 may be made of a generally hard, strong, durable, malleable alloy such as steel. However, the shell 15 could readily be constructed from other rigid materials, such as aluminum, titanium, or any desired metal or non-metal.

The annular channel 120 houses the lead wires 80 shown in FIGS. 2-3. The lead wires 80 are routed through the annular channel 120 before they are fixedly attached to the outer wall 100. The outer wall 100 of the shell 15 has a conical shape and comprises a plurality of projecting flaps 140 and recess areas 150. The projecting flaps 140 extend upwardly from the annular channel and bend away from the center of the shell 15. The projecting flaps 140 are circumferentially spaced about the outer wall 100 of the shell 15 in such a manner to provide structural integrity to the shell 15. In addition, having the projecting flaps 140 bending away from the center of the shell 15 allows the easy installation or disassembly of the diode connection hardware (not shown) while the shell 15 is installed. Furthermore, the projecting flaps 140 acquire from their elastic deformation the elastic force for keeping the lead wire 80 squeezed between the outer wall 100 and the annular channel 120 of the shell 15. Thus, any of various lead wires 80 having considerably different lengths can be retained in place.

The inner wall 110 extends upwardly from the annular channel 120 and is substantially free of projections and/or recess.

The recess areas 150 provide the outer wall 100 with communication of the lead wires 80 with the interior of the annular channel 120 of the shell 15.

One embodiment of the present invention contemplates adding a plurality of openings 160 penetrating each one of the flaps 140 of the outer wall 100. The openings 160 allow a secondary anchor (not shown) such as tied lacing cord to prevent the lead wires 80 from moving out of the shell 15.

Another embodiment of the present invention contemplates coating the shell 15 with a layer of insulating material. Any suitable material known in the art may be used to insulate the shell 15.

Figure 5:
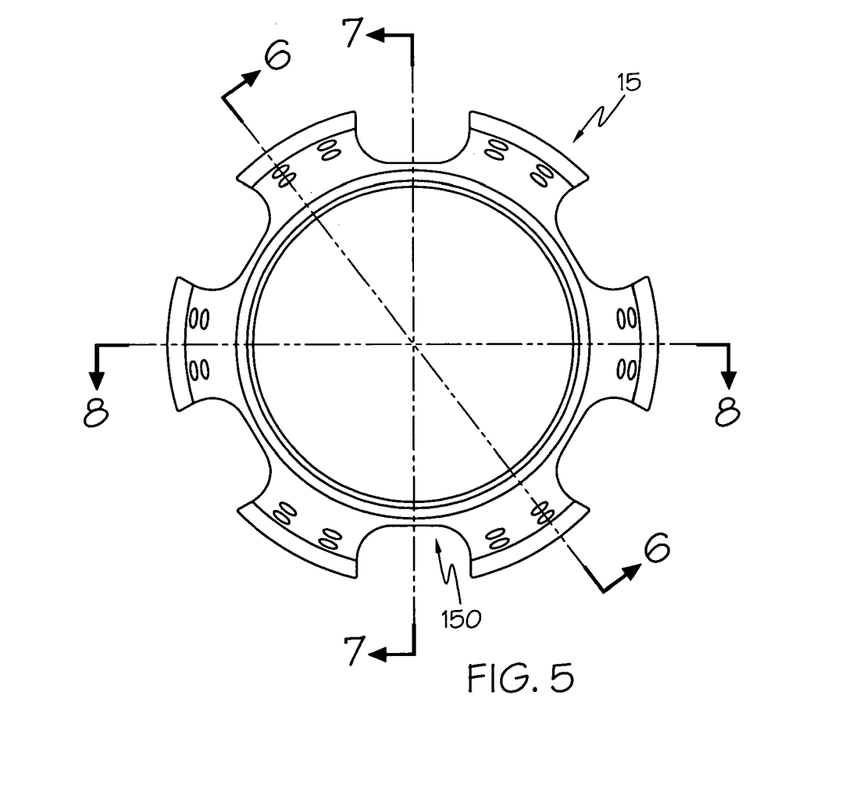
FIG. 5 is a top view of the shell 15 of FIG. 4.

FIG. 5 is a top view of the shell 15 of FIG. 4.

Figure 6:
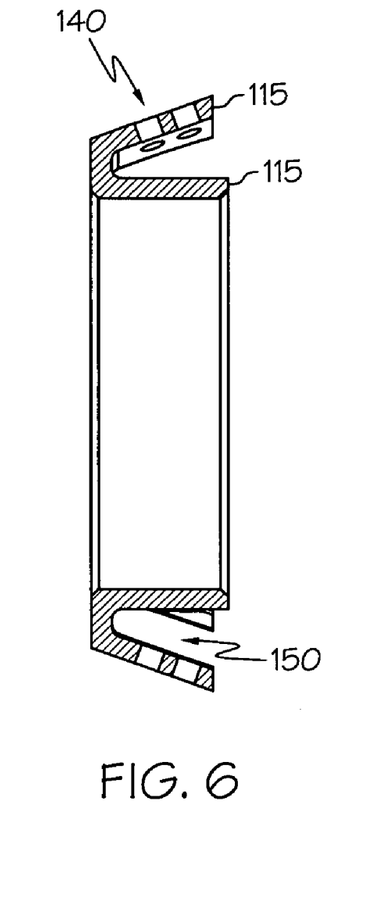
FIG. 6 is a cross sectional view of the shell 15 taken along section B-B' of FIG. 5.

FIG. 6 is a cross sectional view of the shell 15 taken along section B-B' of FIG. 5.

Figure 7:
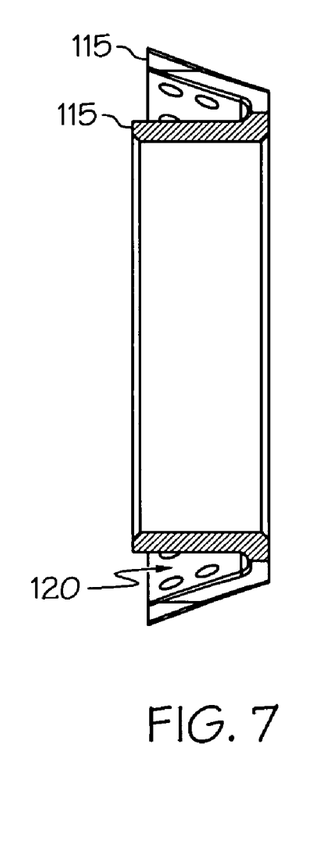
FIG. 7 is a cross sectional view of the shell 15 taken along section A-A' of FIG. 5.

FIG. 7 is a cross sectional view of the shell 15 taken along section A-A' of FIG. 5.

Figure 8:
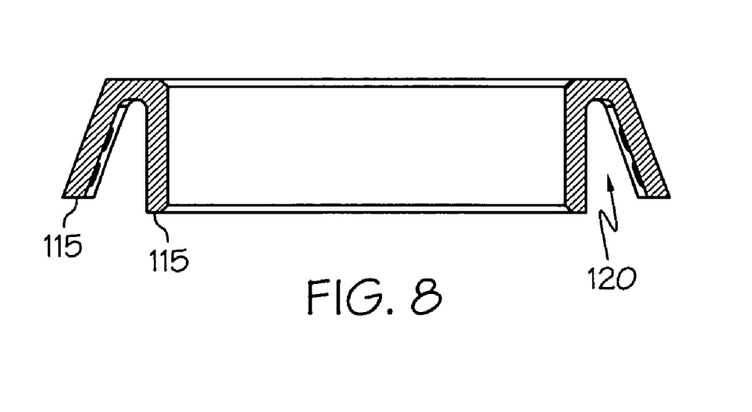
FIG. 8 is a cross sectional view of the shell 15 taken along section C-C' of FIG. 5.

FIG. 8 is a cross sectional view of the shell 15 taken along section C-C' of FIG. 5.

In addition, one embodiment of the present invention contemplates an electrical power rotor 10 includes a rotor shaft 30; an exciter 40 coaxially mounted on to the rotor shaft 30, wherein the exciter 40 includes a plurality of diodes 50 located on the circumference of the rotor shaft 30, each diode 50 includes lead wires 80 routed around the rotor shaft 30; a shell 15 for holding lead wires 80; wherein the shell 15 is mounted into the rotor shaft 30 and comprises: an annular body having a centrally located opening 150 and a V-shaped cross section; wherein the V-shaped cross section comprises an outer wall 100 and an inner wall 110; wherein the outer wall 100, the inner wall 110, and the interior surface of the V-shaped cross section forms an annular channel 120; wherein the outer wall 100 has a circular shape and comprises a plurality of projecting flaps 140 and recess areas 150; wherein the projecting flaps 140 extend upwardly from the annular channel 120 and bend away from the center of the shell 15; wherein the inner wall 110 extends upwardly from the annular channel 120 and is free of projections and/or recess; wherein the annular channel 120 hold the lead wires 80 in position; wherein the shell 15 rotates when the rotor shaft 30 rotates.

Figure 9:
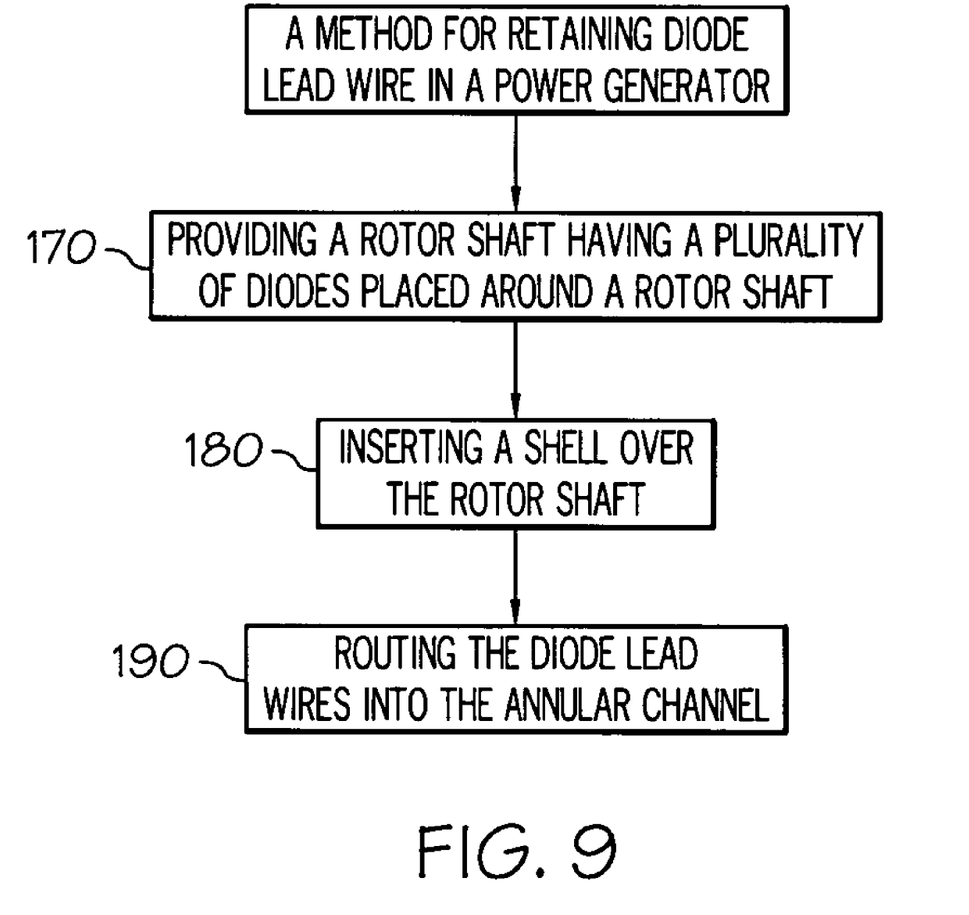
FIG. 9 illustrates a flow chart of the steps of the method according to another aspect of the present invention.

Furthermore, the present invention contemplates a method for retaining diode lead wires in a power generator. The method includes a step 170 of providing a rotor shaft (e.g., rotor shaft 30) having a plurality of diodes (e.g., diodes 50) placed around said rotor shaft (e.g., rotor shaft 30). Each diode (e.g., diodes 50) including lead wires (e.g., lead wires 80) routed around the rotor shaft (e.g., rotor shaft 30).

A further step 180 may include inserting a shell (e.g., shell 15) over the rotor shaft (e.g., rotor shaft 30). The shell (e.g., shell 15) comprising: an annular body having a centrally located opening (e.g., opening 150) and a V-shaped cross section. The V-shaped cross section comprises an outer wall (e.g., outer wall 100) and an inner wall (e.g., inner wall 110). The outer wall (e.g., outer wall 100), the inner wall (e.g., inner wall 110), and the interior surface of the V-shaped cross section forms an annular channel (e.g., annular channel 120). The outer wall (e.g., outer wall 100) has a circular shape and comprises a plurality of projecting flaps (e.g., projecting flaps 140) and recess areas (e.g., recess areas 150). The projecting flaps (e.g., projecting flaps 140) extend upwardly from the annular channel (e.g., annular channel 120) and bend away from the center of the shell (e.g., shell 15). The inner wall (e.g., inner wall 110) extends upwardly from the annular channel (e.g., annular channel 120) and is free of projections and/or recess.

A further step 190 may include routing the diode lead wires (e.g., lead wires 80) into the annular channel (e.g., annular channel 120) of the shell (e.g., shell 15).

It should be understood, of course, that the foregoing relates to exemplary embodiments of the invention and that modifications may be made without departing from the spirit and scope of the invention as set forth in the following claims.

We claim:

1. A shell for holding lead wires comprising:
an annular body having a centrally located opening and a V-shaped cross section;
wherein the V-shaped cross section comprises an outer wall and an inner wall;
wherein the outer wall, the inner wall, and the interior surface of the V-shaped cross section forms an annular channel;
wherein the outer wall has a conical shape and comprises a plurality of projecting flaps and recess areas;
wherein the projecting flaps extend upwardly from the annular channel;
wherein each one of the flaps further includes a plurality of openings;
wherein the inner wall extends upwardly from the annular channel and is free of projections and/or recess; and
wherein the annular channel is configured to hold lead wires in position.

2. The shell of claim 1 wherein the projecting flaps bend away from the centrally located opening of the shell.

3. The shell of claim 1 wherein the projecting flaps are circumferentially spaced about the outer wall of the shell.

4. The shell of claim 1 wherein the shell is made of steel.

5. The shell of claim 1 wherein the shell is made of aluminum, titanium, or a metal alloy.

6. The shell of claim 1 wherein the shell is made of a non-metal material selected from the group consisting of plastic and fiber reinforced composite material.

7. The shell of claim 1 wherein the shell further comprises a layer of insulating material.

8. The shell of claim 1 wherein the projecting flaps are configured to provide structural integrity to the shell.

9. A power generator rotor comprising:
a rotor shaft;
an exciter coaxially mounted on to the rotor shaft, wherein the exciter includes a plurality of diodes mounted on a heat sink which is located on the circumference of the rotor shaft, each diode includes lead wires;
a shell for holding lead wires;
wherein the shell is mounted on to the rotor shaft and comprises:
an annular body having a centrally located opening and a V-shaped cross section;
wherein the V-shaped cross section comprises an outer wall and an inner wall;
wherein the outer wall, the inner wall, and the interior surface of the V-shaped cross section forms an annular channel;
wherein the outer wall has a conical shape and comprises a plurality of projecting flaps and recess areas;
wherein the projecting flaps extend upwardly from the annular channel;
wherein the inner wall extends upwardly from the annular channel and is free of projections and/or recess;
wherein the annular channel is configured to hold the lead wires in position;
wherein the shell rotates when the rotor shaft rotates.

10. The power generator rotor of claim 9 wherein the projecting flaps bend away from the center of the shell.

11. The power generator rotor of claim 9 wherein the projecting flaps are circumferentially spaced about the outer wall of the shell.

12. The power generator rotor of claim 9 wherein the shell is made of steel.

13. The power generator rotor of claim 9 wherein the shell is made of aluminum, titanium, or a metal alloy.

14. The power generator of claim 9 wherein each one of the flaps further includes a plurality of openings.

15. The power generator of claim 9 wherein the shell is made of a nonmetal material selected from the group consisting of plastic and fiber reinforced composite material.

16. The power generator of claim 9 wherein the projecting flaps are configured to provide structural integrity to the shell.

17. A method for retaining diode lead wires in a power generator, the method comprising the steps of:
a) providing a rotor shaft having a plurality of diodes placed around said rotor shaft, wherein each diode includes lead wires;
b) inserting a shell over the rotor shaft, wherein the shell comprises:
an annular body having a centrally located opening and a V-shaped cross section; wherein the V-shaped cross section comprises an outer wall and an inner wall;

wherein the outer wall, the inner wall, and the interior surface of the V-shaped cross section forms an annular channel;

wherein the outer wall has a circular shape and comprises a plurality of projecting flaps and recess areas;

wherein the projecting flaps extend upwardly from the annular channel and bend away from the center of the shell;

wherein the inner wall extends upwardly from the annular channel and is free of projections and/or recess; and c) routing the diode lead wires into the annular channel of the shell.

18. The method of claim 17 further including the step of insulating the shell by applying a layer of insulating material.

19. The method of claim 17 further including the step of securing the lead wires with lacing cord through a plurality of openings added to each one of the flaps of the outer wall.

* * * * *